US012775358B2

(12) United States Patent
Li

(10) Patent No.: US 12,775,358 B2
(45) Date of Patent: Oct. 27, 2026

(54) METHOD AND DEVICE FOR GENERATING HANDWRITING OF TOUCH WRITING, ELECTRONIC DEVICE, AND STORAGE MEDIUM

(71) Applicant: Guangzhou Zhongyuan Intelligent Technology Co., Ltd., Guangzhou (CN)

(72) Inventor: Hao Li, Guangzhou (CN)

(73) Assignee: Guangzhou Zhongyuan Intelligent Technology Co., Ltd., Guangzhou (CN)

( * ) Notice: Subject to any disclaimer, the term of this patent is extended or adjusted under 35 U.S.C. 154(b) by 12 days.

(21) Appl. No.: 18/862,550

(22) PCT Filed: Jun. 30, 2023

(86) PCT No.: PCT/CN2023/104562

§ 371 (c)(1),
(2) Date: Nov. 3, 2024

(87) PCT Pub. No.: WO2024/164486

PCT Pub. Date: Aug. 15, 2024

(65) Prior Publication Data

US 2025/0291440 A1 Sep. 18, 2025

(30) Foreign Application Priority Data

Feb. 7, 2023 (CN) ......................... 202310075897.3

(51) Int. Cl.
*G06F 3/042* (2006.01)

(52) U.S. Cl.
CPC .... *G06F 3/042* (2013.01); *G06F 2203/04101* (2013.01)

(58) Field of Classification Search
None
See application file for complete search history.

(56) References Cited

U.S. PATENT DOCUMENTS 9,207,800 B1 * 12/2015 Eriksson ............. G06F 3/04166
2002/0033805 A1 * 3/2002 Fujioka ................. G06F 3/0421
345/175

(Continued)

FOREIGN PATENT DOCUMENTS

CN 109612398 A 4/2019
CN 114237419 A 3/2022

(Continued)

OTHER PUBLICATIONS

International Search Report received for international Patent Application PCTCN2023/104562, dated Oct. 25, 2023.

(Continued)

*Primary Examiner* — Sarvesh J Nadkarni
(74) *Attorney, Agent, or Firm* — Zhong Law, LLC

(57) ABSTRACT

According to an embodiment of the present disclosure, a method and device for generating handwriting of touch writing, an electronic device, and a storage medium are provided. The method includes: acquiring an infrared-ray dataset generated by touch writing on an infrared touch screen; determining a set of touch points based on the infrared-ray dataset, and calculating a basic attribute parameter of respective touch point within the set of touch points for indicating a touch feature; acquiring blocked-infrared-ray data corresponding to a blocked region of respective touch point within the set of touch points from the infrared-ray dataset, and calculating a blocked ray parameter of respective touch point; generating height feature information of touch points based on the basic attribute parameter and blocked ray parameter of respective touch point, and inputting the height feature information into a preset writing-height prediction model to predict a touch status of respective touch point.

9 Claims, 3 Drawing Sheets

(56) References Cited

U.S. PATENT DOCUMENTS

| | | | | |
|---|---|---|---|---|
| 2002/0075243 | A1* | 6/2002 | Newton | G06F 3/0421 345/173 |
| 2006/0097989 | A1* | 5/2006 | Ho | G06F 3/0421 345/173 |
| 2010/0238139 | A1* | 9/2010 | Goertz | G06F 3/0425 345/175 |
| 2012/0188205 | A1* | 7/2012 | Jansson | G06F 3/042 345/175 |
| 2014/0160054 | A1 | 6/2014 | Rabii et al. | |
| 2015/0277636 | A1* | 10/2015 | Holmgren | G06F 3/0421 345/175 |
| 2016/0092021 | A1* | 3/2016 | Tu | G06F 3/04883 345/173 |
| 2017/0336918 | A1* | 11/2017 | Holman | G06F 3/0421 |
| 2018/0267671 | A1* | 9/2018 | Lee | G06F 3/0416 |
| 2021/0349569 | A1* | 11/2021 | Holmgren | A63F 13/31 |
| 2022/0100310 | A1* | 3/2022 | Shahsavari | G06N 3/09 |
| 2023/0051541 | A1* | 2/2023 | Kim | G06F 3/04186 |
| 2024/0012508 | A1* | 1/2024 | Wu | G06F 3/0428 |

FOREIGN PATENT DOCUMENTS

| | | | |
|---|---|---|---|
| CN | 114690853 | A | 7/2022 |
| CN | 115471852 | A | 12/2022 |
| CN | 115793893 | A | 3/2023 |
| WO | 2019212108 | A1 | 11/2019 |
| WO | 2022257030 | A1 | 12/2022 |

OTHER PUBLICATIONS

Written Opinion of the International Searching Authority received for international Patent Application PCTCN2023/104562, dated Oct. 11, 2023.

First Office Action and search report received for Chinese Patent Application No. 202310075897.3, dated Mar. 18, 2023.

Search Report received for European Patent Application No. 23866596.2, dated Dec. 13, 2024.

* cited by examiner

METHOD AND DEVICE FOR GENERATING HANDWRITING OF TOUCH WRITING, ELECTRONIC DEVICE, AND STORAGE MEDIUM

CROSS-REFERENCE TO RELATED APPLICATIONS

This application is the U.S. National Phase under 35. U.S.C. § 371 of International Application PCT/CN2023/104562, filed Jun. 30, 2023, which claims priority to Chinese Patent Application No. 202310075897.3, filed Feb. 7, 2023. The disclosures of the above-described applications are hereby incorporated by reference in their entirety.

TECHNICAL FIELD

The present disclosure relates to the field of infrared touch technology, and in particular to a method and device for generating handwriting of touch writing, an electronic device, and a storage medium.

BACKGROUND

Infrared touch screen technology (also known as touch screen with infrared technology) is a type of touch screen that uses infrared tubes to form an infrared detection network on a surface of the touch screen. The touch recognition is achieved by the touch object's operation on the touch screen obstructing the infrared rays. This technology can be applied in many scenarios.

A processor performs a computing operation on the touch data generated by the infrared touch screen to generate handwriting that may be displayed on the screen. Due to the sensing elements for emitting and receiving infrared ray on an outer frame of the infrared touch screen being higher than the infrared touch screen at a certain height, and infrared ray propagating on the surface of the infrared touch screen, the infrared ray is received by an opposite reception sensing element through direct emission or reflection. When a user writes on an infrared touch screen, current technologies commonly use the maximum blocking percentage in blocked ray to determine whether a touch object is in contact with the infrared touch screen, so that a writing touch status of the user is determined. However, when users write at a lower height, it is difficult to accurately recognize the touch status of the touch points using the above technical solutions, resulting in touch writing often being generated as connected or curled handwriting, seriously affecting the display effect of the handwriting.

SUMMARY

For all these, the present disclosure provides a method and device for generating handwriting of touch writing, an electronic device, and a storage medium, so as to improve a display effect of handwriting of touch writing.

According to a first aspect of the present disclosure, a method for generating handwriting of touch writing is provided, which includes the following steps:

- acquiring an infrared-ray dataset generated by touch writing on an infrared touch screen;
- determining a set of touch points based on the infrared-ray dataset, and calculating a basic attribute parameter of respective touch point within the set of touch points for indicating a touch feature;
- acquiring blocked-infrared-ray data corresponding to a blocked region of respective touch point within the set of touch points from the infrared-ray dataset, and calculating a blocked ray parameter of respective touch point based on the blocked-infrared-ray data;
- generating height feature information of touch points based on the basic attribute parameter and blocked ray parameter of respective touch point, and inputting the height feature information into a preset writing-height prediction model to predict a touch status of respective touch point; and
- selecting multiple target touch points from the set of touch points based on the touch status, and connecting the target touch points to form handwriting.

According to a second aspect of the present disclosure, a device for generating handwriting of touch writing is provided, which includes:

- a ray-data acquisition module, configured to acquire an infrared-ray dataset generated by touch writing on an infrared touch screen;
- an attribute-parameter calculation module, configured to determine a set of touch points based on the infrared-ray dataset, and respectively calculate a basic attribute parameter of respective touch point within the set of touch points for indicating a touch feature;
- a ray-parameter calculation module, configured to acquire blocked-infrared-ray data corresponding to a blocked region of respective touch point within the set of touch points from the infrared-ray dataset, and calculate a blocked ray parameter of respective touch point based on the blocked-infrared-ray data;
- a touch-status prediction module, configured to generate height feature information of touch points based on the basic attribute parameter and blocked ray parameter of respective touch point, and input the height feature information into a preset writing-height prediction model to predict a touch status of respective touch point; and
- a handwriting generation module, configured to select multiple target touch points from the set of touch points based on the touch status, and connect the target touch points to form handwriting.

According to a third aspect of the present disclosure, an electronic device is provided, which includes a processor, and a memory storing a computer program that is executable by the processor; the computer program, when executed by the processor, causes the electronic device to perform the method for generating handwriting of touch writing according to the first aspect.

According to a fourth aspect of the present disclosure, a storage medium is provided, which stores a computer program, where the computer program, when executed by the processor, performs the method for generating handwriting of touch writing according to the first aspect.

According to the technical solution of the present disclosure, an infrared-ray dataset generated by touch writing on an infrared touch screen is acquired; by acquiring basic attribute parameters of touch features indicated by respective touch point within the set of touch points, the blocked infrared ray corresponding to respective touch point is determined, and plane parameters and corresponding ray parameters of blocked infrared ray are calculated, height feature information of touch points is generated by using basic attribute parameters and blocked ray parameters, and is input into a preset neural network model to predict a touch status of respective touch point, and then multiple target touch points are selected from the set of touch points based on the touch status to connect and form handwriting. This technical solution can ensure the display effect of handwriting of touch writing under different writing-height states, especially even when users write at a lower writing height, the touch status can be quickly and accurately recognized and accurate handwriting can be acquired, which greatly improves the display effect of handwriting of touch writing.

For a better understanding and implementation, the present disclosure is explained in detail below in conjunction with the accompanying drawings.

DESCRIPTION OF THE PREFERRED EMBODIMENTS

Figure 1:
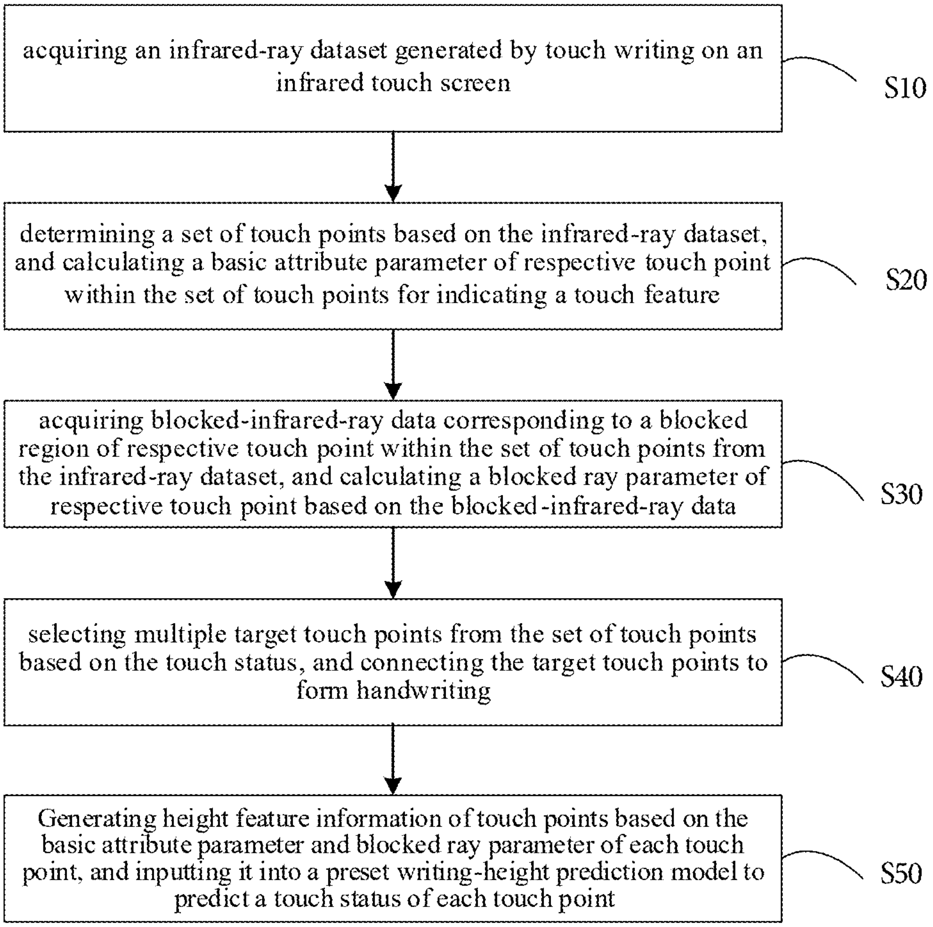
FIG. 1 is a flowchart of a method for generating handwriting of touch writing according to an embodiment.

To provide a clearer understanding of the purpose, technical solution, and advantages of the present disclosure, the embodiments of the present disclosure will be further described in detail in conjunction with the accompanying drawings. When the following description refers to the accompanying drawings, unless otherwise indicated, the same numbers in different drawings represent the same or similar elements.

It should be understood that the embodiments described in the following examples do not represent all embodiments consistent with the present disclosure. On the contrary, they are examples of devices and methods that are consistent with some aspects of the present disclosure as detailed in the attached claims. Based on the embodiments of the present disclosure, all other embodiments obtained by those skilled in the art without creative effort, fall within the claimed scope of the present disclosure.

The terms used in the present disclosure are only for the purpose of describing specific embodiments and are not intended to limit the present disclosure. The singular forms of "one", "a" and "the" used in the present disclosure are also intended to include the plural forms unless the context clearly indicates otherwise. In addition, in the description of the present disclosure, "multiple" refers to two or more unless otherwise specified. It should also be understood that the term "and/or" used in the description refers to and includes any or all possible combinations of one or more related listed items, for example, A and/or B can represent three situations: the existence of A alone, the existence of A and B simultaneously, and the existence of B alone. The character "/" generally indicates that the associated object is an "or" relationship.

It should be understood that, although the terms first, second, third, etc., may be used in the present disclosure to describe various information, this information should not be limited to these terms, and these terms are only used to distinguish similar objects and do not need to be used to describe a specific order or sequence, nor should they be understood as indicating or implying relative importance. For those skilled in the art, the specific meanings of the above terms in the present disclosure can be understood based on specific circumstances. Depending on the context, the words "if"/"in a case of" used in in the present disclosure can be interpreted as "at . . . ", "when . . . " or "in response to determination".

The application scenario of the method for generating handwriting of touch writing in the embodiment of the present disclosure includes a device for generating handwriting of touch writing, the method for generating handwriting of touch writing may execute the method for generating handwriting of touch writing. The device for generating handwriting of touch writing may implement the method for generating handwriting of touch writing through software and/or hardware. The device for generating handwriting of touch writing may be used as a part of the infrared touch screen or independent of the infrared touch screen. The device for generating handwriting of touch writing may be composed of two or more physical entities, or may be composed of one physical entity. The hardware pointed to by the device for generating handwriting of touch writing essentially refers to computer devices. For example, the device for generating handwriting of touch writing may be an intelligent device such as a computer, mobile phone, tablet, or intelligent interactive board.

Referring to FIG. 1, FIG. 1 is a flowchart of a method for generating handwriting of touch writing according to an embodiment, which includes the following steps:

Step S10, acquiring an infrared-ray dataset generated by touch writing on an infrared touch screen.

Due to the installation of the sensing elements for emitting and receiving infrared ray on an outer frame of the infrared touch screen, and the sensing elements for emitting and receiving infrared ray being higher than the surface of the infrared touch screen at a certain height, and infrared ray propagating on the surface of the infrared touch screen, the infrared ray is received by an opposite reception sensing element through direct emission or reflection, and an optical network composed of radial ray is formed. Therefore, in this step, the infrared touch screen may acquire optical network signal data of several rays by scanning the infrared tube to obtain infrared ray data.

In an optional embodiment, the user may use a touch object such as a stylus or finger to perform touch writing operations on the infrared touch screen. The touch object approaches the infrared touch screen, and when the touch object is at a certain height from the infrared touch screen, several rays in the infrared touch screen are blocked, which triggers the touch operation of the touch object on the infrared touch screen. In response to touch writing operations, the infrared touch screen reads the infrared ray dataset scanned by an infrared ray. The infrared ray dataset includes infrared ray data corresponding to several infrared rays which are not blocked and infrared ray data corresponding to several infrared rays which are blocked.

In addition, due to the use of touch objects of different sizes and shapes writing at different positions, the infrared ray data corresponding to the blocked ray scanned varies. Therefore, as an implementation example, the infrared touch screen may first preset an infrared ray threshold, and then compare the infrared ray data corresponding to several rays in the infrared ray dataset with the preset infrared ray threshold. When the infrared ray data corresponding to the rays is different from the infrared ray threshold, it is determined as blocked rays, and the blocked-infrared-ray data corresponding to the blocked infrared rays is acquired from several blocked rays.

Step S20, determining a set of touch points based on the infrared-ray dataset, and respectively calculating a basic attribute parameter of respective touch point within the set of touch points for indicating a touch feature.

In this step, when the user performs touch writing, touch objects such as stylus and fingers come into contact with the infrared touch screen to form touch points. When the touch object passes through the infrared ray network, the touch object blocks the infrared ray in the ray network, so that a touch region with a certain scale is formed. Based on that, the infrared touch screen may first determine the set of touch points formed by multiple touch points based on the infrared ray dataset, and then based on each blocked infrared ray in the infrared ray dataset, the touch points on the infrared touch screen are located, the basic attribute parameters of the touch points are acquired, to indicate the touch features that form the touch points.

In an optional embodiment, the basic attribute parameter may include position coordinates, a motion speed, a time frame, an acceleration, etc. The position coordinate is a coordinate value of the touch point in the infrared ray network, the time frame is the time interval of acquiring respective touch point, the motion speed is a speed value of the touch object corresponding to the touch point moving on the infrared touch screen, and the acceleration is an acceleration value of the touch object corresponding to the touch point when writing is performed on the infrared touch screen.

As an embodiment, when the motion speed and acceleration are acquired, a distance difference and a time difference between the two touch points may be calculated based on the position coordinates and time frames based on the touch points in the front and back time frames, and then the motion speed and acceleration of the touch point may be calculated. The distance difference may be Taxicab geometry distance, Euclidean distance, etc., as follows:

$$v = \frac{|\Delta s|}{\Delta t}$$

In the equation, v is the motion speed value, Δs is the distance difference, Δt is the time difference.

$$a = \frac{|\Delta v|}{\Delta t}$$

In the equation, Δv is the difference in motion speed within this time difference, and a is the acceleration.

Step S30, acquiring blocked-infrared-ray data corresponding to a blocked region of respective touch point within the set of touch points from the infrared-ray dataset, and calculating a blocked ray parameter of respective touch point based on the blocked-infrared-ray data.

In this step, the infrared touch screen acquires the blocked region corresponding to respective touch point within the set of touch points, then combines it with the infrared ray dataset to acquire the blocked infrared ray corresponding to the blocked region and obtain the blocked-infrared-ray data, and calculates the blocked ray parameters for respective touch point based on the blocked-infrared-ray data.

Figure 2:
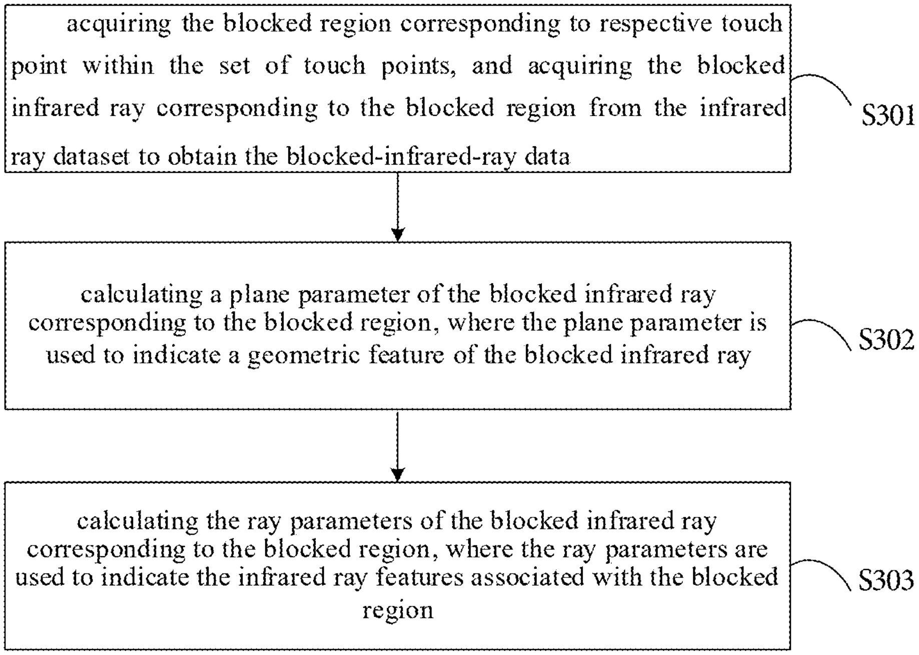
FIG. 2 is a flowchart of an example of Step S30.

In an embodiment, for the process of Step S30, referring to FIG. 2, FIG. 2 is a flowchart of an example of Step S30, including:

S301, acquiring the blocked region corresponding to respective touch point within the set of touch points, and acquiring the blocked infrared ray corresponding to the blocked region from the infrared ray dataset to obtain the blocked-infrared-ray data.

Specifically, the infrared touch screen may acquire a circumscribed circle corresponding to respective touch point, expand it based on a preset expansion radius, take the expanded circumscribed circle corresponding to respective touch point as a blocked region of respective touch point, then acquire the blocked infrared ray corresponding to the blocked region, and form the blocked-infrared-ray data based on the blocked infrared ray.

S302, calculating a plane parameter of the blocked infrared ray corresponding to the blocked region, where the plane parameter is used to indicate a geometric feature of the blocked infrared ray.

As an embodiment, by acquiring a geometric feature parameter of the blocked infrared ray, and obtaining the plane parameters of respective touch points based on the geometric feature parameter, the plane parameter of a blocked infrared ray may be calculated. The plane parameters include a length, width, and area of the blocked infrared ray. Based on that, the length and width of respective touch point may be calculated through geometric algorithms, image algorithms, and FBP (filtered back projection algorithm), and the corresponding plane parameters may be obtained by calculating the area.

In general, the touch point has a shape of a convex polygon. In order to reduce the error caused by the writing angle, after acquiring respective touch point, the infrared touch screen may use specific algorithms, such as geometric algorithms, image algorithms to calculate the characteristics of respective touch point. The infrared touch screen expands the region of respective touch point, the geometric features of the expanded region will represent the geometric features of respective touch point, so that the accuracy of touch status detection for respective touch point is improved.

S303, calculating the ray parameters of the blocked infrared ray corresponding to the blocked region, where the ray parameters are used to indicate the infrared ray features associated with the blocked region.

As an embodiment, for calculating ray parameters, the ray characteristics of the infrared ray associated with the blocked region on the infrared touch screen may be determined, and the ray parameters may be acquired based on the ray characteristics. The ray parameters may include the number of blocked rays, ray distance, ray depth, blocked ray ratio, etc.

Figure 3:
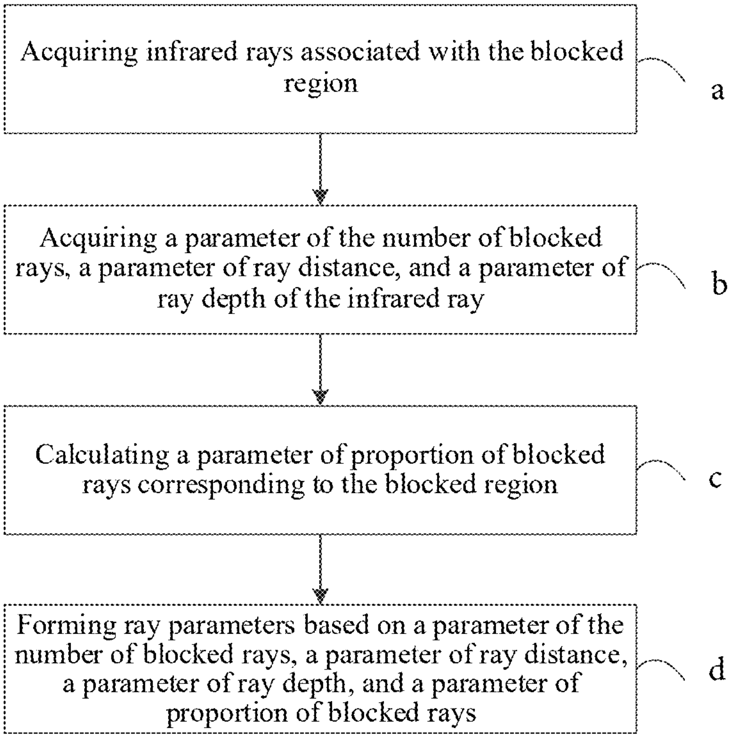
FIG. 3 is a flowchart of an example for calculating ray parameters.

In an embodiment, referring to FIG. 3, FIG. 3 is a flowchart of an example for calculating ray parameters. For the method for acquiring ray parameters based on the ray features mentioned above, it may include:

Step a: acquiring infrared rays associated with the blocked region.

Step b: acquiring a parameter of the number of blocked rays, a parameter of ray distance, and a parameter of ray depth of the infrared ray.

As an embodiment, the specific process may be as follows.

b1, acquiring a minimum distance between respective infrared rays in the blocked region of the touch point and the touch point.

Specifically, the infrared touch screen detects the ray in the blocked region corresponding to respective touch point, acquires each ray in the blocked region corresponding to respective touch point, and acquires the minimum distance between each ray in the blocked region corresponding to the touch point and the touch point.

b2, selecting several target rays having a minimum distance that meets the minimum distance threshold from the infrared rays in the blocked region to obtain the parameter of the number of blocked rays.

As an example, the infrared touch screen acquires several target rays with a minimum distance that meets the preset minimum distance threshold from the blocked infrared rays in the blocked region. The number of several target rays is used as the parameter for the number of blocked rays.

Specifically, the infrared touch screen acquires several target rays with a minimum distance that meets the preset minimum distance threshold from the blocked infrared rays in the blocked region. Firstly, the minimum distance between each ray in the blocked region of the touch point and the touch point is compared with the preset minimum distance threshold. When the minimum distance between the ray and the touch point is less than the minimum distance threshold, the ray is set as the target ray, so that several target rays in the blocked region are acquired, and the number of target rays in the blocked region is counted, the number of several target rays is used as the parameter of the number of blocked rays.

b3, acquiring the minimum distances between respective target rays and the touch point to obtain the parameter of ray distance.

Specifically, the infrared touch screen may use the minimum distance between several target rays and the touch point as the parameter of ray distance.

b4, acquiring the ray depth of respective target ray.

Specifically, the light depth is the ratio of the intensity of the ray after being blocked to the intensity of the ray before being blocked. The infrared touch screen may calculate the intensity of the blocked ray of respective target ray and the intensity of the ray without being blocked of respective target ray to acquire the ray depth of several target rays.

b5, performing averaging processing and extremum processing on the ray depth of respective target ray in the blocked region to obtain the parameter of ray depth.

The parameter of ray depths may include an average depth parameter, a maximum depth parameter, a minimum depth parameter, etc. Specifically, the infrared touch screen performs averaging processing on the ray depths of several target rays in the blocked region, acquires the average depth parameters of several target rays in the blocked region, and performs extremum processing on the ray depths of several target rays in the blocked region, and acquires the maximum depth parameter and the minimum depth parameter.

Step c, calculating a parameter of proportion of blocked rays corresponding to the blocked region.

(1) Acquiring the number of infrared rays located within the set number of ray depth intervals based on the ray depth of the target ray.

Specifically, the infrared touch screen acquires the number of rays located in preset ray depth intervals based on the depth of several target rays.

(2) Calculating the proportion of the number of infrared rays to all target rays in the blocked region to obtain the parameter of proportion of blocked rays.

Specifically, the infrared touch screen calculates the proportion of the number of rays in several ray depth intervals to all target rays in the blocked region, and acquires the parameter of proportion of blocked rays.

As an embodiment, an infrared touch screen may divide the total interval [0, 100%] into several ray depth intervals of the same range by presetting the number of ray depth intervals. For example, if the number of ray depth intervals is 5, the total interval may be divided into five ray depth intervals of the same range, namely [0, 20%], [20%, 40%], [40, 60%], [60, 80%], and [80, 100%], acquires the number of rays located in preset ray depth intervals based on the ray depths of several target rays; calculates the proportion of the number of rays in several ray depth intervals to all target rays in the blocked region, and acquires the parameter of proportion of blocked rays.

As another embodiment, an infrared touch screen may acquire the number of infrared rays corresponding to the touch point located in the preset ray depth intervals by presetting several light depth intervals, based on the ray depth of respective infrared ray associated with the touch point; calculates the proportion of the number of rays in several ray depth intervals to all target rays in the blocked region, and acquires the parameter of proportion of blocked rays.

Step d, forming ray parameters based on a parameter of the number of blocked rays, a parameter of ray distance, a parameter of ray depth, and a parameter of proportion of blocked rays.

According to the technical solution of the above embodiment, the infrared touch screen may construct the height feature information of the touch point based on various ray parameters of the touch point, in order to improve the accuracy of detecting the touch status of the touch point.

Step S40, generating height feature information of touch points based on the basic attribute parameter and blocked ray parameter of respective touch point, and inputting the height feature information into a preset writing-height prediction model to predict a touch status of respective touch point.

In this step, the basic attribute parameters, plane parameters, and ray parameters are first used to generate height feature information for respective touch point. Then, the height feature information of respective touch point is input into a preset writing-height prediction model to predict the touch status of respective touch point. Preferably, the writing-height prediction model may be deployed on existing touch algorithms, and the touch status of touch points may be predicted and outputted.

For writing-height prediction model, it may be a RNN neural network model, such as a recurrent neural network (RNN) model, recurrent neural network model of LSTM (Long Short-term Memory), etc.

Figure 4:
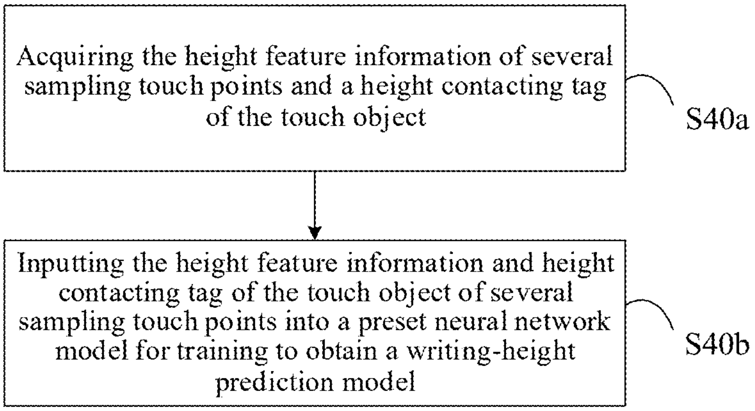
FIG. 4 is a flowchart of an example of a method for training a writing-height prediction model.

In order to make the writing-height prediction model of the present disclosure more clearly, an embodiment of training a writing-height prediction model is described below. Referring to FIG. 4, FIG. 4 is a flowchart of an example of a method for training a writing-height prediction model.

S40*a*, acquiring the height feature information of several sampling touch points and a height contacting label of the touch object.

Specifically, the height contacting label of the touch object is used to indicate the touch status of the touch object contacting with the infrared touch screen, where the touch status may be continuous or discrete values.

For continuous values, it may be the height value of respective touch point from the infrared touch screen, for example, the height of the touch object from the infrared touch screen.

For discrete values, it may be various states of touch writing, such as the writing state, including a pen-less state, a pen-down state, a pen continuation state, and a pen-up state, which reflects whether the touch object contacts with the infrared touch screen when each sampling touch point is generated, and whether the user carries out the writing when the sample touch point is generated.

S40*b*, inputting the height feature information and height contacting label of the touch object of several sampling touch points into a preset neural network model for training to obtain a writing-height prediction model.

Specifically, the infrared touch screen inputs the height feature information and height contacting label of the touch object of several sampling touch points into the preset neural network model for training, acquires several trained neural network models, and calculates evaluation parameters of several trained neural network models, where the evaluation parameters include determination coefficient, root-mean-square deviation and residual prediction deviation, then, based on the evaluation parameters of several trained neural network models, extracts the target neural network model from the trained neural network models as the writing-height prediction model; training and adjusting the training model until satisfactory results are obtained.

Figure 5:
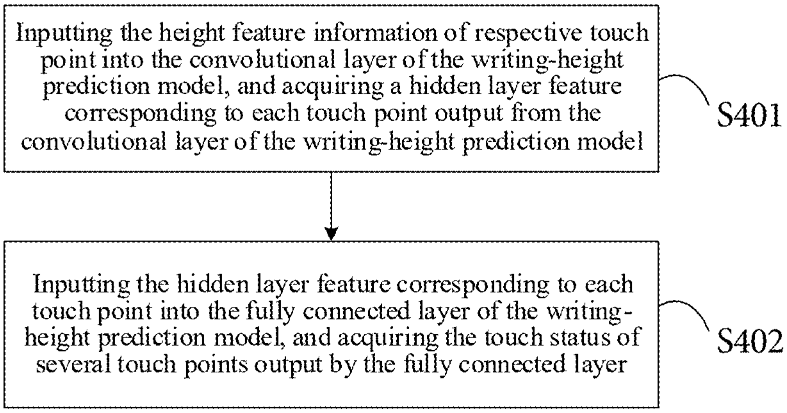
FIG. 5 is a flowchart of an example for predicting touch status.

In an embodiment, the writing-height prediction model includes convolutional layers and fully connected layers which are sequentially connected. Correspondingly, referring to FIG. 5 for the step of inputting the height feature information into a preset writing-height prediction model to predict a touch status of respective touch point in the step S40, FIG. 5 is a flowchart of an example for predicting touch status, including the following steps:

Step S401, inputting the height feature information of respective touch point into the convolutional layer of the writing-height prediction model to acquire a hidden layer feature corresponding to respective touch point output from the convolutional layer of the writing-height prediction model.

The convolution layer includes a LSTM layer connected by several layers. The LSTM layer includes the convolution algorithm related to calculating the characteristics of the hidden layer, and is used to abstract the height feature information of respective touch point to another dimensional space, so as to show the more abstract height feature information of respective touch point, thereby better performing linear division. Based on that, the infrared touch screen may input the height feature information of respective touch point into the convolutional layer of the writing-height prediction model, and acquire the hidden layer feature corresponding to respective touch point output from the convolutional layer of the writing-height prediction model.

Step S402, inputting the hidden layer feature corresponding to respective touch point into the fully connected layer of the writing-height prediction model to acquire the touch status of several touch points output by the fully connected layer.

Specifically, the full connection layer includes an activation function and a normalization function. The activation function is used to calculate the corresponding polarity-probability distribution vector based on the hidden layer feature, and the normalization function is used to acquire the corresponding contacting label based on the polarity-probability distribution vector.

Based on that, the infrared touch screen may input the hidden layer features of touch objects corresponding to several touch points into the fully connected layer of the writing-height prediction model, and acquires the contacting labels of several touch points output from the fully connected layer. The touch status may be an output result of continuous values, such as the height of the touch object from the infrared touch screen, or an output result of discrete values, such as the writing status of the touch object, including the pen-less state, the pen-down state, the pen continuation state, and the pen-up state.

Step S50, selecting multiple target touch points from the set of touch points based on the touch status, and connecting the target touch points to form handwriting.

Specifically, the infrared touch screen acquires touch points in the pen-down state and the pen continuation state from several touch points based on their touch statuses of several touch points as target touch points, and then connects these target touch points to obtain handwriting of touch writing.

In the above solution, when the touch status is recognized as discrete values, special processing may be performed on some obvious abnormal touch points, such as skip point suppression. As an example, the touch status of the touch point may include None: at this point, the distance from the screen is too high, and the current touch point is removed; Down: when the point height reaches a low writing requirement, outputting of touch points is started; Move: the touch point is in motion and points continues to be reported; Up: the height of the touch point is relatively high, which belongs to the pen-up state.

According to the technical solution of the above implementation example, the touch status of the touch point is accurately calculated to determine whether the user has entered the writing and pen-down operation. This approach avoids common issues of linking and curling during the writing process on the infrared touch screen, allowing for the precise and efficient generation of handwriting.

The following describes an embodiment of a device for generating handwriting of touch writing.

Figure 6:
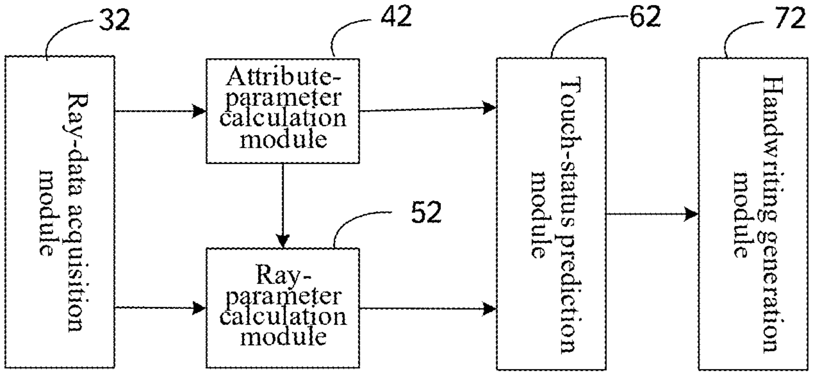
FIG. 6 is a schematic diagram of the structure of a device for generating handwriting of touch writing in an embodiment.

Referring to FIG. 6, FIG. 6 is a schematic diagram of the structure of a device for generating handwriting of touch writing in an embodiment. The device may achieve all or part of the method for generating handwriting of touch writing through software, hardware, or a combination of both. The device for generating handwriting of touch writing includes:

a ray-data acquisition module 10, configured to acquire an infrared-ray dataset generated by touch writing on an infrared touch screen;

an attribute-parameter calculation module 20, configured to determine a set of touch points based on the infrared-ray dataset, and respectively calculate a basic attribute parameter of respective touch point within the set of touch points for indicating a touch feature;

a ray-parameter calculation module 30, configured to acquire blocked-infrared-ray data corresponding to a blocked region of respective touch point within the set of touch points from the infrared-ray dataset, and calculate a blocked ray parameter of respective touch point based on the blocked-infrared-ray data;

a touch-status prediction module 40, configured to generate height feature information of touch points based on the basic attribute parameter and blocked ray parameter of respective touch point, and input the height feature information into a preset writing-height prediction model to predict a touch status of respective touch point; and a handwriting generation module 50, configured to select multiple target touch points from the set of touch points based on the touch status, and connect the target touch points to form handwriting.

According to this embodiment, the device for generating handwriting of touch writing may execute the method for generating handwriting of touch writing according to the embodiments of the present disclosure, and its implementation principle is similar. The actions performed by each module in the device for generating handwriting of touch writing according to each embodiment of the present disclosure correspond to the steps in the method for generating handwriting of touch writing according to each embodiment of the present disclosure. For the detailed functional description of each module of the device for generating handwriting of touch writing, reference may be made to the corresponding description of the method for generating handwriting of touch writing mentioned above, which will not be repeated herein.

According to the technical solution of the present disclosure, the ray-data acquisition module 10 acquires an infrared-ray dataset generated by touch writing on an infrared touch screen; the attribute-parameter calculation module 20 acquires basic attribute parameters of touch features indicated by respective touch point within the set of touch points, so that the blocked infrared ray corresponding to respective touch point is determined, and the ray-parameter calculation module 30 calculates plane parameters and corresponding ray parameters of blocked infrared ray, the touch-status prediction module 40 generates height feature information of touch points by using basic attribute parameters and blocked ray parameters, and inputs the height feature information into a preset neural network model to predict a touch status of respective touch point, and then the handwriting generation module 50 selects multiple target touch points from the set of touch points based on the touch status to connect and form handwriting. This technical solution can ensure the display effect of handwriting of touch writing under different writing-height states, especially even when users write at a lower writing height, the touch status can be quickly and accurately recognized and accurate handwriting can be acquired, which greatly improves the display effect of handwriting of touch writing.

Hereinafter, embodiments of an electronic device and a storage medium are described.

Figure 7:
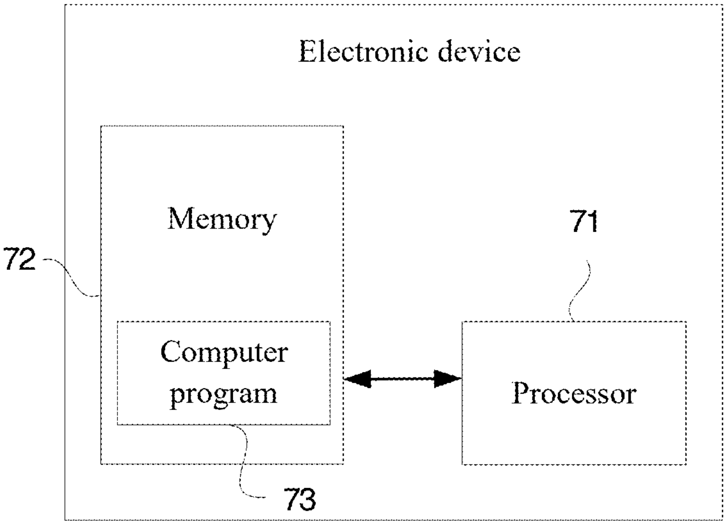
FIG. 7 is a schematic diagram of a structure of an electronic device according to one embodiment.

According to this embodiment, an electronic device is provided as shown in FIG. 7, FIG. 7 is a schematic diagram of a structure of an electronic device according to one embodiment. The electronic device includes a processor 71, a memory 72, and a computer program 73 stored on the memory 72 that may run on the processor. The electronic device may store multiple instructions, which are suitable for loading and executing the method steps of any of the above embodiments by the processor. The specific execution process may be seen in the specific instructions of the method embodiments, which will not be repeated herein.

The processor may include one or more processing cores. A processor 71 utilizes various interfaces and circuits to connect various parts in the electronic device. By running or executing instructions, programs, code sets, or instruction sets stored in a memory 72, and accessing data in the memory 72, the processor 71 performs various functions of the device for generating handwriting of touch writing, an electronic device and processes data. Optionally, the processor 71 may be implemented by using at least one hardware selected form digital signal processing (DSP), field-programmable gate array (FPGA), or programmable logic array (PLA). The processor 71 may integrate one or several combinations of central processing unit (CPU), graphics processing unit (GPU), and modem. The CPU mainly handles operating systems, user interfaces, and application programs; GPU is configured to render and draw the content required for being displayed on the touch screen; the modem is configured to handle wireless communication. It may be understood that the above-mentioned modem may also be implemented separately through a single chip without being integrated into the processor 71.

The memory 72 may include either random access memory (RAM) or read-only Memory. Optionally, the memory 72 includes a non-transient computer-readable storage medium. The memory 72 may be configured to store instructions, programs, code, code sets, or instruction sets. The memory 72 may include a storage procedure area and a storage data area, where the storage procedure area may be configured to store instructions for implementing the operating system, instructions for at least one function (such as touch instructions, etc.), instructions for implementing the embodiments of the above methods, etc.; the storage data area may be configured to store the data involved in various embodiments of the above methods. The memory 72 may optionally be at least one storage device located far away from the above-mentioned processor 71.

According to an embodiment of the present disclosure, a storage medium is further provided, and the storage medium may store multiple instructions. The instructions are suitable for loading and executing the method steps of the above embodiment by the processor. For the specific execution process, reference may be made to the specific description of any of the above embodiments, which will not be repeated herein.

Those skilled in the art may clearly understand that, for the convenience and conciseness of description, only the division of each functional unit and module mentioned above is provided as an example. In practical applications, the above functions may be assigned to different functional units or modules according to needs, that is, the internal structure of the device may be divided into different functional units or modules to complete all or part of the functions described above. The functional units and modules in the embodiment may be integrated into a single processing unit, or they may exist separately physically, or two or more units may be integrated into one unit. The integrated units mentioned above may be implemented in the form of hardware or software functional units. In addition, the specific names of each functional unit and module are only for the purpose of distinguishing them from each other and are not used to limit the claimed scope of the present disclosure. The specific working process of the units and modules in the above system may refer to the corresponding process in the above-mentioned method implementation examples, which will not be repeated herein.

In the above embodiments, the descriptions of each embodiment have their own emphasis. For parts that are not detailed or recorded in a certain embodiment, reference may be made to the relevant descriptions of other embodiments.

Those skilled in the art may realize that the units and algorithm steps of each example described in conjunction with the disclosed embodiments in this description may be implemented in electronic hardware, or a combination of computer software and electronic hardware. Whether these functions are executed in hardware or software depends on the specific application and design constraints of the technical solution. Those skilled in the art may use different methods to implement the described functions for each specific application, but such implementation should not be considered beyond the scope of the present disclosure.

In the embodiments provided in the present disclosure, it should be understood that the disclosed devices/terminal devices and methods may be implemented in other ways. For example, the device/terminal device embodiments described above are only illustrative, such as the division of modules or units, which is only a logical functional division. In actual implementation, there may be other division methods, such as multiple units or components that may be combined or integrated into another system, or some features that may be ignored or not executed. On the other hand, the coupling or direct coupling or communication connection displayed or discussed between each other may be indirect coupling or communication connection through some interfaces, devices or units, which may be electrical, mechanical or other forms.

The units described as separate components may be or may not be physically separated, and the components displayed as units may be or may not be physical units, which may be located in one place or distributed across multiple network units. Some or all of the units may be selected according to actual needs to achieve the purpose of this embodiment.

In addition, in various embodiments of the present disclosure, each functional unit may be integrated into a single processing unit, each unit may physically exist separately, or two or more units may be integrated into one unit. The integrated units mentioned above may be implemented in both hardware and software functional units.

If integrated modules/units are implemented in the form of software functional units and sold or used as independent products, they may be stored on a computer readable storage medium. Based on that understanding, according to the present disclosure, all or part of the processes in the above-mentioned embodiments may be implemented, and may also be completed by instructing the relevant hardware through a computer program. The computer program may be stored in a computer-readable storage medium, and when the computer program is executed by the processor, the steps of each method embodiment may be implemented. The computer programs include computer program code, and may be in the form of source code, object code, executable files, or some intermediate forms.

The present disclosure is not limited to the above implementation methods. If various modifications or deformations of the present disclosure do not deviate from the spirit and scope of the present disclosure, when these modifications and deformations fall within the scope of the claims and equivalent technical scope of the present disclosure, the present disclosure also intends to include these modifications and deformations.

What is claimed is:

1. A method for generating handwriting of touch writing, the method comprising:

acquiring an infrared-ray dataset generated by touch writing on an infrared touch screen;

determining a set of touch points based on the infrared-ray dataset, and calculating a basic attribute parameter of respective touch point within the set of touch points for indicating a touch feature;

acquiring blocked-infrared-ray data corresponding to a blocked region of the respective touch point within the set of touch points from the infrared-ray dataset, and calculating a blocked ray parameter of the respective touch point based on the blocked-infrared-ray data;

generating height feature information of touch points based on the basic attribute parameter and blocked ray parameter of the respective touch point, and inputting the height feature information into a preset writing-height prediction model to predict a touch status of the respective touch point; and selecting multiple target touch points from the set of touch points based on the touch status, and connecting the target touch points to form handwriting, wherein the calculating the blocked ray parameter of the respective touch point based on the blocked-infrared-ray data comprises:

acquiring a geometric feature parameter of the blocked region, obtaining a plane parameter of the respective touch points based on the geometric feature parameter; and determining ray characteristics of an infrared ray associated with the blocked region on the infrared touch screen, and acquiring a corresponding ray parameter of the respective touch point based on the ray characteristics, wherein the determining the ray characteristics of the infrared ray associated with the blocked region on the infrared touch screen, and acquiring the corresponding ray parameter of the respective touch points based on the ray characteristics comprising:

acquiring the infrared ray associated with the blocked region;

acquiring a parameter associated with a number of blocked rays, a parameter of a ray distance, and a parameter of a ray depth for the infrared ray;

calculating a parameter of a proportion of blocked rays corresponding to the blocked region; and forming the ray parameter based on the parameter associated with the number of blocked rays, the parameter of the ray distance, the parameter of the ray depth, and the parameter of the proportion of blocked rays, wherein the acquiring the parameter associated with the number of blocked rays, the parameter of the ray distance, and the parameter of the ray depth for the infrared ray comprising:

acquiring a minimum distance between respective infrared rays in the blocked region of the touch point and the touch point;

selecting multiple target rays having the minimum distance that meets a minimum distance threshold from the respective infrared rays in the blocked region to obtain the parameter associated with the number of blocked rays;

acquiring the minimum distances between the respective target rays and the touch point to obtain the parameter of the ray distance;

acquiring the ray depth of respective target rays; and performing averaging processing and extremum processing on the ray depth of respective target ray in the blocked region to obtain the parameter of the ray depth; wherein the parameter of the ray depth comprises an average depth parameter, a maximum depth parameter, and a minimum depth parameter.

2. The method of claim 1, wherein the acquiring blocked-infrared-ray data corresponding to the blocked region of the respective touch point within the set of touch points from the infrared-ray dataset comprises:

acquiring the blocked region corresponding to the respective touch point within the set of touch points; and acquiring the blocked-infrared-ray data corresponding to the blocked region from the infrared-ray dataset to obtain the blocked-infrared-ray data.

3. The method of claim 1, wherein the basic attribute parameter comprises position coordinates, a motion speed, a time frame, and an acceleration; the plane parameter comprises a length, width, and area of a touch object; the ray parameter comprises a unique ray blocking position and depth of the touch point, and all ray blocking positions and depths of the touch point.

4. The method of claim 1, wherein the calculating the parameter of the proportion of blocked rays corresponding to the blocked region comprising:

acquiring a number of infrared rays located within a depth range of the set number of rays based on the ray depth of the target ray; and calculating a proportion of the number of infrared rays to all target rays in the blocked region to obtain the parameter of the proportion of the blocked rays.

5. The method of claim 1, further comprising:

acquiring the height feature information of multiple sampling touch points and marking a height contacting label of a touch object on respective sampling touch point based on the height feature information to indicate a touch status; and inputting the height feature information and height contacting label of the touch object of the multiple sampling touch points into a preset neural network model for training to obtain a writing-height prediction model, wherein the writing-height prediction model comprises a convolutional layer and a fully connected layer that are sequentially connected.

6. The method of claim 5, wherein the inputting the height feature information into the preset writing-height prediction model to predict the touch status of the respective touch point comprises:

inputting the height feature information of the respective touch point into the convolutional layer of the writing-height prediction model to acquire a hidden layer feature corresponding to the respective touch point; and inputting the hidden layer feature corresponding to the respective touch point into the fully connected layer of the writing-height prediction model to acquire the touch status of the respective touch point.

7. An electronic device, comprising:

a processor; and a memory storing a computer program that is executable by the processor; wherein the computer program, responsive to determining that executed by the processor, causes the electronic device to perform the method of claim 1.

8. A non-transitory computer-readable storage medium, storing a computer program, wherein the computer program, responsive to determining that executed by a processor, performs the method of claim 1.

9. A device for generating handwriting of touch writing, comprising:

a ray-data acquisition module to acquire an infrared-ray dataset generated by touch writing on an infrared touch screen;

an attribute-parameter calculation module to determine a set of touch points based on the infrared-ray dataset, and respectively calculate a basic attribute parameter of respective touch point within the set of touch points for indicating a touch feature;

a ray-parameter calculation module to acquire blocked-infrared-ray data corresponding to a blocked region of the respective touch point within the set of touch points from the infrared-ray dataset, and calculate a blocked ray parameter of the respective touch point based on the blocked-infrared-ray data;

a touch-status prediction module to generate height feature information of touch points based on the basic attribute parameter and blocked ray parameter of the respective touch point, and input the height feature information into a preset writing-height prediction model to predict a touch status of the respective touch point; and a handwriting generation module to select multiple target touch points from the set of touch points based on the touch status, and connect the target touch points to form handwriting, wherein the calculating the blocked ray parameter of the respective touch point based on the blocked-infrared-ray data comprises:

acquiring a geometric feature parameter of the blocked region, obtaining a plane parameter of the respective touch points based on the geometric feature parameter; and determining ray characteristics of an infrared ray associated with the blocked region on the infrared touch screen, and acquiring a corresponding ray parameter of the respective touch point based on the ray characteristics, wherein the determining the ray characteristics of the infrared ray associated with the blocked region on the infrared touch screen, and acquiring the corresponding ray parameter of the respective touch points based on the ray characteristics comprising:

acquiring the infrared ray associated with the blocked region;

acquiring a parameter associated with a number of blocked rays, a parameter of a ray distance, and a parameter of a ray depth for the infrared ray;

calculating a parameter of a proportion of blocked rays corresponding to the blocked region; and forming the ray parameter based on the parameter associated with the number of blocked rays, the parameter of the ray distance, the parameter of the ray depth, and the parameter of the proportion of blocked rays, wherein the acquiring the parameter associated with the number of blocked rays, the parameter of the ray distance, and the parameter of the ray depth for the infrared ray comprising:

acquiring a minimum distance between respective infrared rays in the blocked region of the touch point and the touch point;

selecting multiple target rays having the minimum distance that meets a minimum distance threshold from the respective infrared rays in the blocked region to obtain the parameter associated with the number of blocked rays;

acquiring the minimum distances between the respective target rays and the touch point to obtain the parameter of the ray distance;

acquiring the ray depth of respective target rays; and performing averaging processing and extremum processing on the ray depth of respective target ray in the blocked region to obtain the parameter of the ray depth; wherein the parameter of the ray depth comprises an average depth parameter, a maximum depth parameter, and a minimum depth parameter.

* * * * *